United States Patent
Raz et al.

(10) Patent No.: US 9,672,189 B2
(45) Date of Patent: Jun. 6, 2017

(54) METHODS FOR EFFECTIVE NETWORK-SECURITY INSPECTION IN VIRTUALIZED ENVIRONMENTS

(75) Inventors: Ofer Raz, Ramat Gan (IL); Amnon Perlmutter, Givataim (IL); Erez Berkner, Tel Aviv (IL)

(73) Assignee: CHECK POINT SOFTWARE TECHNOLOGIES, LTD., Tel Aviv (IL)

( * ) Notice: Subject to any disclaimer, the term of this patent is extended or adjusted under 35 U.S.C. 154(b) by 900 days.

(21) Appl. No.: 12/507,830

(22) Filed: Jul. 23, 2009

(65) Prior Publication Data
US 2010/0269171 A1 Oct. 21, 2010

Related U.S. Application Data

(60) Provisional application No. 61/170,681, filed on Apr. 20, 2009.

(51) Int. Cl.
| | |
|---|---|
| G06F 21/00 | (2013.01) |
| G06F 17/00 | (2006.01) |
| G06F 21/60 | (2013.01) |
| H04L 29/06 | (2006.01) |
| G06F 15/16 | (2006.01) |
| G06F 11/00 | (2006.01) |

(52) U.S. Cl.
CPC ............ G06F 17/00 (2013.01); G06F 11/00 (2013.01); G06F 15/16 (2013.01); G06F 21/606 (2013.01); H04L 63/12 (2013.01)

(58) Field of Classification Search
CPC . H04L 63/14; H04L 63/1408; H04L 63/1416; H04L 63/1425; H04L 63/1433; H04L 63/20; H04L 63/304; H04L 63/30; H04L 63/306; H04L 63/0227; H04L 63/12; G06F 17/00; G06F 15/16; G06F 11/00; G06F 21/552; G06F 21/50; G06F 21/51; G06F 14/00; G06F 15/66; G06F 21/606
USPC ...................................... 726/24–25
See application file for complete search history.

(56) References Cited

U.S. PATENT DOCUMENTS

| | | | | |
|---|---|---|---|---|
| 2001/0029544 | A1* | 10/2001 | Cousins | 709/233 |
| 2003/0051163 | A1* | 3/2003 | Bidaud | 713/201 |
| 2008/0163370 | A1* | 7/2008 | Maynard | 726/22 |

(Continued)

*Primary Examiner* — Joseph P Hirl
*Assistant Examiner* — Chi Nguy
(74) *Attorney, Agent, or Firm* — Mark M. Friedman

(57) ABSTRACT

The present invention discloses methods for effective network-security inspection in virtualized environments, the methods including the steps of: providing a data packet, embodied in machine-readable signals, being sent from a sending virtual machine to a receiving virtual machine via a virtual switch; intercepting the data packet by a sending security agent associated with the sending virtual machine; injecting the data packet into an inspecting security agent associated with a security virtual machine via a direct transmission channel which bypasses the virtual switch; forwarding the data packet to the security virtual machine by employing a packet-forwarding mechanism; determining, by the security virtual machine, whether the data packet is allowed for transmission; upon determining the data packet is allowed, injecting the data packet back into the sending security agent via the direct transmission channel; and forwarding the data packet to the receiving virtual machine via the virtual switch.

14 Claims, 2 Drawing Sheets

(56) References Cited

U.S. PATENT DOCUMENTS

2009/0073895 A1* 3/2009 Morgan et al. ............... 370/255
2009/0254990 A1* 10/2009 McGee ........................... 726/22
2009/0282483 A1* 11/2009 Bennett .......................... 726/23
2012/0039336 A1* 2/2012 Richmond .............. G06F 9/545
                                                                                               370/392

* cited by examiner

METHODS FOR EFFECTIVE NETWORK-SECURITY INSPECTION IN VIRTUALIZED ENVIRONMENTS

This patent application claims priority under 35 U.S.C. §119(e) to U.S. Provisional Patent Application No. 61/170, 681, filed Apr. 20, 2009, which is hereby incorporated by reference in its entirety.

FIELD AND BACKGROUND OF THE INVENTION

The present invention relates to methods for effective network-security inspection in virtualized environments.

With many computer networks moving into virtualized environments, it is becoming essential to provide security for such virtual networks. A simplistic solution is to add a firewall as a virtual machine, configuring the virtual network so that all traffic passes through, and gets inspected by, the firewall. However, such an approach requires complicated provisioning, and can be easily defeated if the network configuration is modified, either by mistake or maliciously.

It would be desirable to have methods for effective network-security inspection in virtualized environments.

SUMMARY OF THE INVENTION

It is the purpose of the present invention to provide methods for effective network-security inspection in virtualized environments.

The term "machine-readable signals" is used herein to refer to signals (e.g. optical, electrical, and magnetic) which can be stored and retrieved from a data-processing machine. Such machine-readable signals can be used to embody, inter alia, a data packet being transmitted in a virtualized network environment.

Embodiments of the present invention provide methods for fast security inspection in virtualized environments, leveraging virtualization vendors' APIs (e.g. VMsafe for VMware). To overcome the limitations mentioned above, virtualization solutions provide security software with an option to "hook" into all virtual network links (logically, the connections between each virtual machine and a virtual switch).

Embodiments of the present invention enable such "hooking" to inspect all virtual network traffic, both securely and at high performance, minimizing the overhead of security in such virtualized environments. Such performance enhancements can yield an increase in traffic inspection by a factor of 70 compared to prior-art methods for packet forwarding. Such methods, inter alia, provide the ability to efficiently and transparently forward network traffic between a virtual network link and a security virtual machine, where it is treated as regular network traffic, and not forward through a special channel which would be slower, and would require a special agent to be installed on the security virtual machine.

Embodiments of the present invention utilize the ability to attach a security agent on each port of a virtual switch. Such security agents have the ability to inject a packet, received by an agent, into a different port. The packet then undergoes security inspection, and is injected back into the virtual switch.

Therefore, according to the present invention, there is provided for the first time a method for effective network-security inspection in virtualized environments, the method including the steps of: (a) providing a data packet, embodied in machine-readable signals, being sent from a sending virtual machine to a receiving virtual machine via a virtual switch; (b) intercepting the data packet by a sending security agent associated with the sending virtual machine; (c) injecting the data packet into an inspecting security agent associated with a security virtual machine via a direct transmission channel which bypasses the virtual switch; (d) forwarding the data packet to the security virtual machine by employing a packet-forwarding mechanism; (e) determining, by the security virtual machine, whether the data packet is allowed for transmission; (f) upon determining the data packet is allowed, injecting the data packet back into the sending security agent via the direct transmission channel; and (g) forwarding the data packet to the receiving virtual machine via the virtual switch.

Preferably, the method further includes the steps of: (h) prior to said step (c), determining, by the sending security agent, whether the data packet is allowed for transmission; (i) implementing a security-processing mechanism, by the sending security agent, on the data packet; (j) upon determining the data packet needs further security processing, continuing to step (c); (k) upon determining the data packet is not allowed, dropping the data packet; and (l) upon determining the data packet is allowed, continuing to step (g).

Preferably, the security virtual machine includes at least one security component selected from the group consisting of: a firewall, an Intrusion Prevention System (IPS), an Intrusion Detection System (IDS), a Data-Loss Prevention (DLP) system, a Virtual Private Network (VPN), a Uniform Resource Locator (URL) filter, a malware filter, and a web filter.

Preferably, the method further includes the step of: (h) prior to step (f), upon determining the data packet is allowed, tagging the data packet as a security-cleared packet; and wherein step (g) includes: (i) intercepting the security-cleared packet by a receiving security agent associated with the receiving virtual machine; (ii) inspecting, by the receiving security agent, whether an incoming packet has a security-cleared tag; and (iii) upon determining the incoming packet has the security-cleared tag, transmitting the incoming packet to the receiving virtual machine.

Most preferably, step (g) further includes: (iv) upon determining the incoming packet does not have the security-cleared tag, forwarding the incoming packet to the security virtual machine; and (v) performing steps (e)-(g) on the incoming packet.

Preferably, the packet-forwarding mechanism is a standard packet-transmittal mechanism provided by a hypervisor virtualization infrastructure.

Preferably, the packet-forwarding mechanism is a direct interface into the security virtual machine.

Most preferably, the direct interface is configured to utilize a component selected from the group consisting of: a memory module, a cache memory module, and an associated network interface card (NIC) resource.

Preferably, step (d) includes buffering and aggregating packets to provide high performance for traffic consisting of many small packets.

According to the present invention, there is provided for the first time a computer-readable storage medium having computer-readable code embodied on the computer-readable storage medium, the computer-readable code including: (a) program code for intercepting a data packet embodied in machine-readable signals, the data packet being sent from a sending virtual machine to a receiving virtual machine, by a sending security agent associated with the sending virtual machine via a virtual switch; (b) program code for injecting the data packet into an inspecting security agent associated with a security virtual machine via a direct transmission channel which bypasses the virtual switch; (c) program code for forwarding the data packet to the security virtual machine by employing a packet-forwarding mechanism; (d) program code for determining, by the security virtual machine, whether the data packet is allowed for transmission; and (e) program code for, upon determining the data packet is allowed, injecting the data packet back into the sending security agent via the direct transmission channel; and (f) program code for forwarding the data packet to the receiving virtual machine via the virtual switch.

Preferably, the computer-readable code further includes, (g) program code for, prior to program code (b), determining, by said sending security agent, whether the data packet is allowed for transmission; (h) implementing a security-processing mechanism, by the sending security agent, on the data packet; (i) program code for, upon determining the data packet needs further security processing, continuing to program code (b); (j) program code for, upon determining the data packet is not allowed, dropping the data packet; and (k) program code for, upon determining the data packet is allowed, continuing to program code (f).

Preferably, the security virtual machine includes at least one security component selected from the group consisting of: a firewall, an Intrusion Prevention System (IPS), an Intrusion Detection System (IDS), a Data-Loss Prevention (DLP) system, a Virtual Private Network (VPN), a Uniform Resource Locator (URL) filter, a malware filter, and a web filter.

Preferably, the computer-readable code further includes: (g) program code for, prior to executing program code (e), upon determining the data packet is allowed, tagging the data packet as a security-cleared packet; and wherein program code (f) further includes: (i) program code for intercepting the security-cleared packet by a receiving security agent associated with the receiving virtual machine; (ii) program code for inspecting, by the receiving security agent, whether an incoming packet has a security-cleared tag; and (iii) program code for, upon determining the incoming packet has the security-cleared tag, transmitting the incoming packet to the receiving virtual machine.

Most preferably, program code (f) further includes: (iv) program code for, upon determining the incoming packet does not have the security-cleared tag, forwarding the incoming packet to the security virtual machine; and (v) program code for performing program code (d)-(f) on the incoming packet.

Preferably, the packet-forwarding mechanism is a standard packet-transmittal mechanism provided by a hypervisor virtualization infrastructure.

Preferably, the packet-forwarding mechanism is a direct interface into the security virtual machine.

Most preferably, the direct interface is configured to utilize a component selected from the group consisting of: a memory module, a cache memory module, and an associated NIC resource.

Preferably, program code (c) includes program code for buffering and aggregating packets to provide high performance for traffic consisting of many small packets.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods for effective network-security inspection in virtualized environments. The principles and operation for network-security inspection in virtualized environments, according to the present invention, may be better understood with reference to the accompanying description and the drawings.

Figure 1:
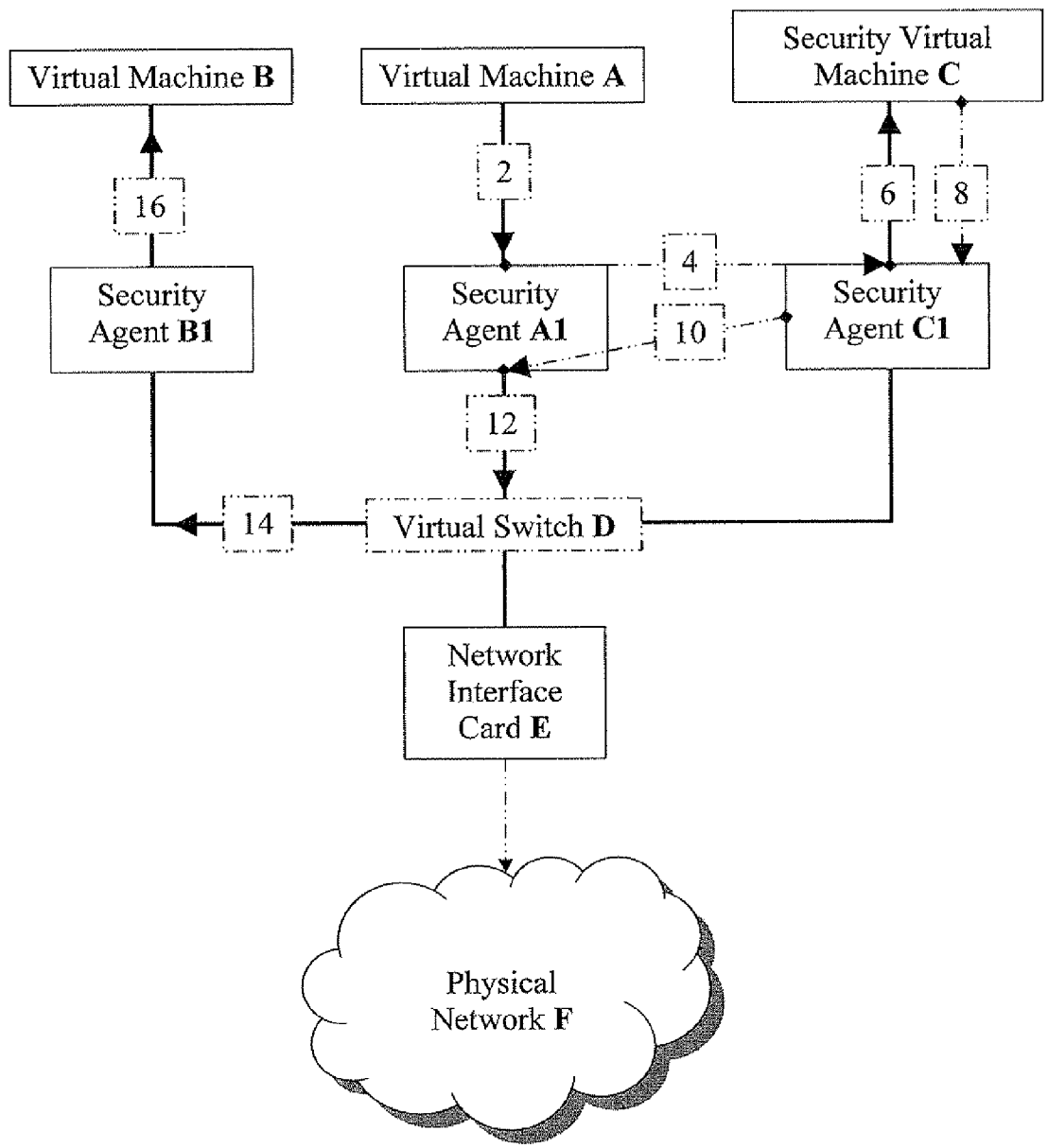
FIG. 1 is a simplified schematic block diagram of packet flow from one virtual-machine to another, according to preferred embodiments of the present invention.

Referring now to the drawings, FIG. 1 is a simplified schematic block diagram of packet flow from one virtual machine to another, according to preferred embodiments of the present invention. A virtual machine (VM) A sends a data packet to a VM B (Flow 2). The packet is intercepted by a security agent A1, and is injected directly by a security agent C1 (Flow 4) to a security VM C (Flow 6). Security agents A1 and C1 are located on a virtual switch D which is can be operationally connected to a network interface card (NIC) E for connecting to a physical network F. When the packet is intercepted and injected by respective security agents A1 and C1, virtual switch D is bypassed.

After security VM C inspects the packet, the packet is intercepted by security agent C1 (Flow 8) which tags the packet as a "security-cleared" packet, and injects the packet directly back to security agent A1 (Flow 10) to continue the regular journey of the packet along virtual switch D toward VM B (Flows 12-14). It is noted that Flows 4 and 10 occur along a direct transmission channel which bypasses virtual switch D. When incoming packets are intercepted by a security agent B1, security agent B1 checks for a "security-cleared" tag, and forwards security-cleared packets to VM B (Flow 16) without additional inspection.

Figure 2:
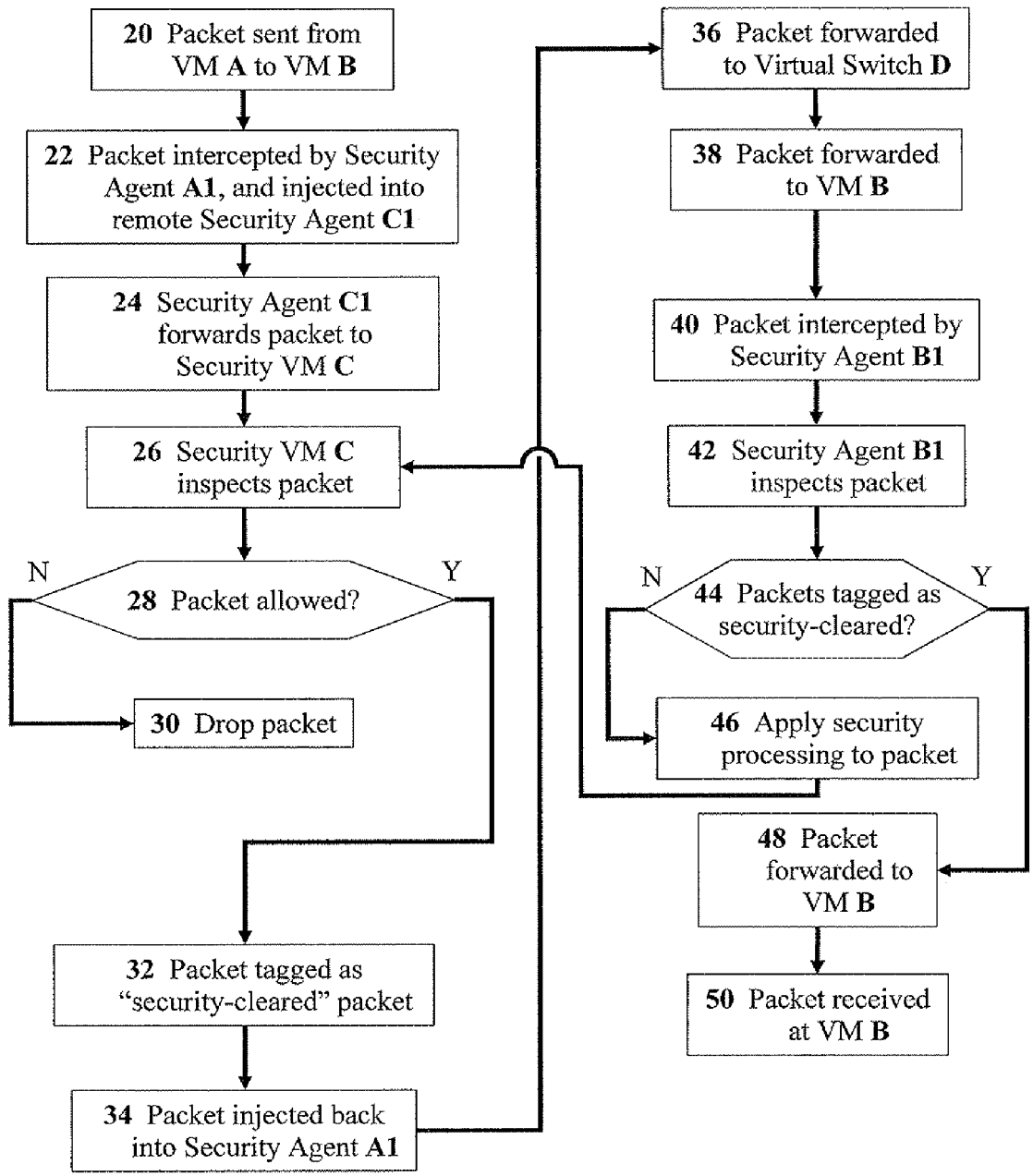
FIG. 2 is a simplified flowchart of the process steps for packet flow from one virtual machine to another, according to preferred embodiments of the present invention.

FIG. 2 is a simplified flowchart of the process steps for packet flow from one virtual machine to another, according to preferred embodiments of the present invention. The process starts when a packet is sent from VM A to VM B (Step 20). The packet is intercepted by security agent A1, and injected into remote security agent C1 (Step 22). Security agent C1 forwards the packet to security VM C (Step 24). Security VM C inspects the packet (Step 26), and determines whether the packet is allowed (Step 28). If the packet is not allowed, then the packet is dropped (Step 30). If the packet is allowed, then the packet is tagged as "security cleared" (Step 32).

The packet is injected back into security agent A1 (Step 34). The packet is then forwarded to virtual switch D (Step 36). Virtual switch D checks the packet, and forwards the packet to VM B (Step 38). The packet is intercepted by security agent B1 (Step 40). Security agent B1 inspects all incoming packets (Step 42), and determines whether the packets are tagged as security-cleared (Step 44). If a packet is not tagged, then security processing is applied to the packet (Step 46). The security processing means that the packet is forwarded back to security VM C for inspection (Step 26). If the packet is tagged, then the packet is forwarded to VM B (Step 48). Finally, the packet is received at VM B (Step 50). It is noted that Steps 22 and 34 occur along a direct transmission channel which bypasses virtual switch D.

It is noted that in some embodiments security agent A1 can include its own security-processing mechanism (e.g. Check Point's SecureXL API technology, U.S. Pat. No. 6,496,935), obviating the need to transfer the packet to security VM C. It is further noted that the packet-forwarding mechanism in Step 24 can be a standard packet-transmittal mechanism provided by a hypervisor virtualization infrastructure, or a direct interface into security VM C (e.g. utilizing a memory module, a cache memory module, or an associated NIC resource). It is also noted that buffering and aggregating of packets to provide high performance for traffic consisting of many small packets can be performed in Step 24 as well.

While the invention has been described with respect to a limited number of embodiments, it will be appreciated that many variations, modifications, and other applications of the invention may be made.

What is claimed is:

1. A method for effective network-security inspection of virtual traffic over a network, in virtualized environments, the method comprising the steps of:
    (a) providing a data packet, embodied in machine-readable signals, being sent from a sending virtual machine to a receiving virtual machine via a virtual switch;
    (b) intercepting said data packet by a sending security agent associated with said sending virtual machine;
    (c) injecting said data packet into an inspecting security agent associated with a security virtual machine via a direct transmission channel which bypasses said virtual switch;
    (d) forwarding said data packet to said security virtual machine by a network interface card (NIC), said forwarding by said NIC including buffering and aggregating packets to increase performance of data packet traffic over said network;
    (e) determining, by said security virtual machine, whether said data packet is allowed for transmission;
    (f) upon determining said data packet is allowed, injecting said data packet back into said sending security agent via said direct transmission channel;
    (g) forwarding said data packet to said receiving virtual machine via said virtual switch; and,
    (h) prior to said step (f), upon determining said data packet is allowed, tagging said data packet as a security-cleared packet; and wherein said step (g) includes:
        (i) intercepting said security-cleared packet by a receiving security agent associated with said receiving virtual machine;
        (ii) inspecting, by said receiving security agent, whether an incoming packet has a security-cleared tag;
        (iii) upon determining said incoming packet has said security-cleared tag, transmitting said incoming packet to said receiving virtual machine;
        (iv) upon determining said incoming packet does not have said security-cleared tag, forwarding said incoming packet to said security virtual machine; and,
        (v) performing said steps (e)-(g) on said incoming packet.

2. The method of claim 1, wherein said security virtual machine includes at least one security component selected from the group consisting of: a firewall, an Intrusion Prevention System (IPS), an Intrusion Detection System (IDS), a Data-Loss Prevention DLP) system, a Virtual Private Network (VPN), a Uniform Resource Locator (URL) filter, a malware filter, and a web filter.

3. The method of claim 1, wherein said packet-forwarding mechanism is a standard packet-transmittal mechanism provided by a hypervisor virtualization infrastructure.

4. The method of claim 1, wherein said packet-forwarding mechanism is a direct interface into said security virtual machine.

5. The method of claim 4, wherein said direct interface is configured to utilize a component selected from the group consisting of: a memory module, a cache memory module, and an associated network interface card (NIC) resource.

6. The method of claim 1, wherein said sending virtual machine and said receiving virtual machine share a common physical machine.

7. The method of claim 1, the method further comprising the steps of:
    (i) prior to said step (c), determining, by said sending security agent, whether said data packet is allowed for transmission;
    (j) implementing a security-processing mechanism, by said sending security agent, on said data packet;
    (k) by said sending security agent: upon determining said data packet needs further security processing, continuing to said step (c);
    (l) by said sending security agent: upon determining said data packet is not allowed, dropping said data packet; and
    (m) by said sending security agent: upon determining said data packet is allowed, continuing to said step (g).

8. A non-transitory computer-readable storage medium having computer-readable code embodied on the computer-readable storage medium, the computer-readable code comprising:
    (a) program code for intercepting a data packet embodied in machine-readable signals, transmitted over a network, said data packet being sent from a sending virtual machine to a receiving virtual machine, by a sending security agent associated with said sending virtual machine via a virtual switch;
    (b) program code for injecting said data packet into an inspecting security agent associated with a security virtual machine via a direct transmission channel which bypasses said virtual switch;
    (c) program code for causing forwarding of said data packet to said security virtual machine by a network interface card (NIC), said forwarding by said NIC including buffering and aggregating packets to increase performance of data packet traffic over said network;
    (d) program code for determining, by said security virtual machine, whether said data packet is allowed for transmission;
    (e) program code for, upon determining said data packet is allowed, injecting said data packet back into said sending security agent via said direct transmission channel;
    (f) program code for forwarding said data packet to said receiving virtual machine via said virtual switch; and,
    (g) program code for, prior to executing said program code (e), upon determining said data packet is allowed, tagging said data packet as a security-cleared packet; and wherein said program code (f) further includes:
        (i) program code for intercepting said security-cleared packet by a receiving security agent associated with said receiving virtual machine;
        (ii) program code for inspecting, by said receiving security agent, whether an incoming packet has a security-cleared tag;

(iii) program code for, upon determining said incoming packet has said security-cleared tag, transmitting said incoming packet to said receiving virtual machine;
(iv) program code for, upon determining said incoming packet does not have said security-cleared tag, forwarding said incoming packet to said security virtual machine; and
(v) program code for performing said program code (d)-(f) on said incoming packet.

9. The storage medium of claim 8, wherein said security virtual machine includes at least one security component selected from the group consisting of: a firewall, an Intrusion Prevention System (IPS), an Intrusion Detection System (IDS), a Data-Loss Prevention (DLP) system, a Virtual Private Network (VPN), a Uniform Resource Locator (URL) filter, a malware filter, and a web filter.

10. The storage medium of claim 8, wherein said packet-forwarding mechanism is a standard packet-transmittal mechanism provided by a hypervisor virtualization infrastructure.

11. The storage medium of claim 8, wherein said packet-forwarding mechanism is a direct interface into said security virtual machine.

12. The storage medium of claim 11, wherein said direct interface is configured to utilize a component selected from the group consisting of: a memory module, a cache memory module, and an associated network interface card (NIC) resource.

13. The storage medium of claim 8, wherein said sending virtual machine and said receiving virtual machine share a common physical machine.

14. The storage medium of claim 8, the computer-readable code further comprising:
(h) program code for, prior to said program code (b), determining, by said sending security agent, whether said data packet is allowed for transmission;
(i) program code for, implementing a security-processing mechanism, by said sending security agent, on said data packet;
(j) program code for, by said sending security agent: upon determining said data packet needs further security processing, continuing to said program code (b);
(k) program code for, by said sending security agent: upon determining said data packet is not allowed, dropping said data packet; and
(l) program code for, by said sending security agent: upon determining said data packet is allowed, continuing to said program code (f).

* * * * *